June 2, 1931. F. C. MORRIS 1,808,247
COMPOSITION BUSHING AND PROCESS OF MAKING THE SAME
Filed April 22, 1929
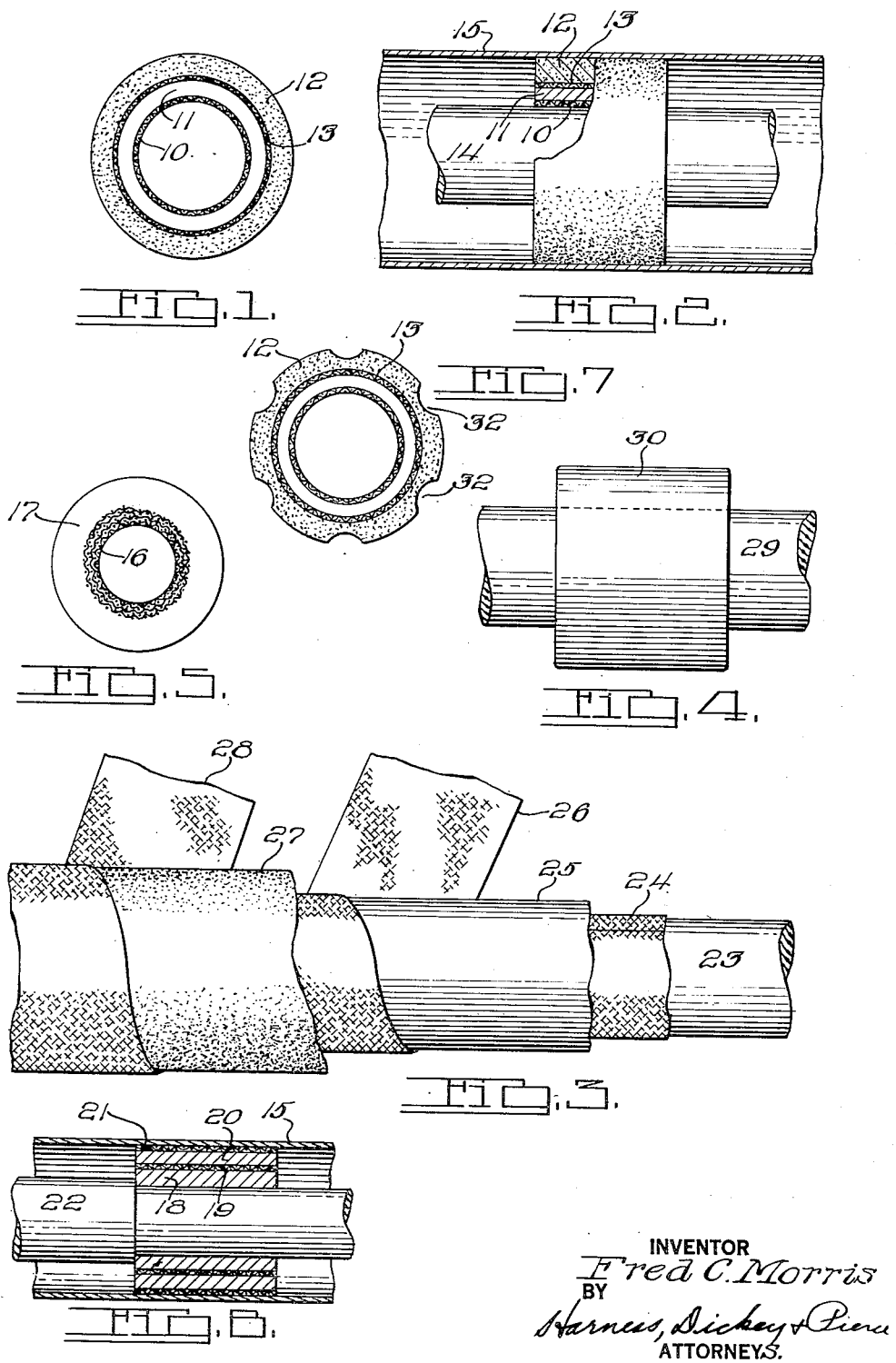
INVENTOR
Fred C. Morris
BY
Harness, Dickey & Pierce
ATTORNEYS.

Patented June 2, 1931

1,808,247

UNITED STATES PATENT OFFICE

FRED C. MORRIS, OF SAN FRANCISCO, CALIFORNIA

COMPOSITION BUSHING AND PROCESS OF MAKING THE SAME

Application filed April 22, 1929. Serial No. 357,157.

This invention relates to bushings or bearings of a composite nature and process of making the same, the principal object being the provision of a bushing that will require no lubrication after assembly, that will be resilient, and that will permit its reception in an opening in a supporting part that may vary a substantial amount from a definite figure, as well as the provision of a simple and inexpensive process for producing the same.

Another object is to provide a bushing or bearing member comprising a fibrous shell impregnated with a dry lubricant and intimately joined with a shape maintaining part of moldable material.

Another object is to provide a bearing or bushing member comprising a fibrous part impregnated with a dry lubricant, a rigid shape-maintaining part and a resilient holding part all integrally united to form a unitary structure.

Another object is to provide a bushing member comprising a bearing portion of a fibrous material impregnated with a dry lubricant maintained in shape by a rigid portion of moldable material which in turn is provided with a coat of resilient material such as rubber integrally connected to the rigid part by vulcanizing or the like, either directly or with the interposition of a layer of fibrous or other material.

The above being among the objects of the present invention the same consists in certain features of constructions, combinations of parts and process of manufacture to be hereinafter described with reference to the accompanying drawings, and then claimed, having the above and other objects in view.

In the accompanying drawings which illustrates suitable embodiments of the present invention and in which like numerals refer to like parts throughout the several different views:

Fig. 1 is an end view of one form of my bushing or bearing member.

Fig. 2 is a partially broken side view of the bearing member shown in Fig. 1, illustrating the same in operative position with relation to a pair of parts such as may utilize the bushing between them in actual operation.

Fig. 3 is a more or less diagrammatic view illustrating the manner in which the bushing shown in Figs. 1 and 2 are preferably formed during the process of manufacture.

Fig. 4 is a side elevation of one of the bushing members at a later step in the process of manufacturing the same than is illustrated in Fig. 3.

Fig. 5 is an end view of a modified form of my bushing.

Fig. 6 is a fragmentary sectional view taken radially through another modified form of my bushing.

Fig. 7 is an end view of a third modified form of my bushing.

In the mechanical art there are many instances of cases wherein one part has bearing in another part and in which the bearing is destroyed not from the rubbing friction present between the two parts but rather from the shocks or vibrations which are transmitted from one part to the other through the bearing. There are also many instances of a like sort in which the bearing surface is not so greatly affected by the actual load put upon the bearing, due to the weight carried by one of the parts, as they are because of the load put upon the bearing by misalignment of the two parts. Instances of the first class are particularly found in the steering columns of automobiles in which the bearings for the steering columns are not destroyed by the rotation of the columns in the same, but are greatly affected by the shocks transmitted through the steering columns from the wheels, and instances of the second class often arise in the brake mechanism in automobiles.

The present invention provides a bushing or bearing particularly adaptable for use in the cases above described and comprises a construction in which resilient means are provided for supporting the bearing surface and which because of the resiliency of the same substantially eliminates wear due to the shocks being transmitted to the same, and further is such as to be able to allow the bearing surface a limited freedom of movement with respect to the supporting part whereby any slight misalignment may be taken up within the same without imposing a material increase of pressure upon the bearing surfaces.

A preferred embodiment of the present invention is illustrated in Figs. 1 and 2 of the accompanying drawings which illustrates a bushing particularly adaptable for use in connection with the steering column of an automobile, or for like uses. The bushing therein shown comprises an inner shell 10 formed of fabric or other fibrous material preferably impregnated with graphite or other dry lubricant and which forms the bearing surface of the bushing. Surrounding the sleeve 10 is a layer 11 of a moldable material intimately joined to the sleeve 10, the layer 11 being rigid so as to maintain the proper shape of the sleeve 10. The rigid material 11 is in turn surrounded by a layer of resilient material 12 intimately connected to the layer 11 either directly or with the interposition of a layer 13 of fibrous material. The layer 12 is preferably formed of soft rubber and the layer 11 may be formed of hard rubber, and in such case the layer 11 may be vulcanized to the sleeve 10 and the layers 11 and 12 either vulcanized together or vulcanized to the intermediate layer 13 as the case may be. The inside diameter of the portion 10 is formed to a size to slidably receive a shaft such as the steering column 14 in Fig. 2 without being compressed thereby, and the layer 12 may be formed to a slightly greater diameter than the diameter of the opening in which it is to be received, such as the interior of the steering column jacket 15 shown in Fig. 2, so that it must be compressed in being inserted in the opening, thus setting up sufficient friction between the bushing and the member 15 to hold it against axial displacement with respect to the member 15 in most cases without the aid of additional means. Due to the fact that the outer layer 12 is resilient it will be apparent that a relatively great variation in the size of the opening in which it may be received is possible without materially affecting the operativeness of the device. This feature is material and tends toward economy in manufacture when such bushings are used. The adaptability of the bushings to fit openings of greater variation in dimensions may be increased by forming axially parallel grooves in the surface of the bushing such as the grooves 32 in Fig. 7.

It will be apparent that in this bushing the inner layer 10 forms an anti-friction bearing which needs no lubrication after assembly and which is maintained in its proper shape by the layer 11, the layer 12 absorbing any shocks that may be transmitted to the bushing, thereby relieving the bearing surface of the effects of such shocks, the layer 12 not only absorbing such shocks but allowing the member which has bearing within the same to be slightly out of alignment with the opening in which the bushing is received without imposing an undue load on the bearing surface, and further permitting relatively great variations in the size of the opening in which the bushing may be received.

In Fig. 5 a modified form of this construction is shown which may be employed in cases where the outer resilient layer 12 is unnecessary because of the absence of the shocks or misalignment above referred to. In this case the bushing may comprise only the inner layer 16 of dry lubricant impregnated fabric and the outer layer 17 of rigid moulded material. It may be found desirable in this or other cases to increase the thickness of the material 16 over that of the material 10 shown in Fig. 1 as indicated in Fig. 5.

In Fig. 6 is shown a construction similar to the construction shown in Figs. 1 and 2 with exception that the bushing is adapted to be secured to the shaft 14 and to turn in the jacket 15, in which case the bearing is between the bushing and the jacket 15. The bushing in this case is provided with an inner resilient core 18 which may or may not be followed by a fibrous layer 19 simliar to the layer 13 in Figs. 1 and 2, and which is surrounded by the rigid molded layer 20 to the exterior of which the layer 21 of fibrous material impregnated with a dry lubricant is secured. In this case the shaft 14 may or may not be provided with a shoulder 22 for preventing longitudinal movement of the bushing relative to the axis of the shaft 14. The advantages derived from this construction are, of course, substantially identical with the construction indicated in Figs. 1 and 2 with the exception that in this case the diameter of the shaft 14 may vary between the relatively great limits while the interior diameter of the jacket 15 is preferably held to relatively close limits.

Although the broad features involved in the method of making these bushings forms the subject matter of my application for Letters Patent of the United States for improvements in method of making bushing, filed April 22, 1929, Serial No. 357,155, it is thought desirable to here outline briefly the preferred steps of such method.

The preferred method of making the bushing shown in Figs. 1 and 2 and also in Fig. 5 as far as the same applies thereto, is as follows: As indicated in Figs. 3 and 4, a mandrel such as 23 having a materially greater diameter than the shaft 14 which is to be received in the bushing is employed and is first covered by a layer 24 of fibrous material preferably impregnated with a dry lubricant and which when completed will serve as the bearing portion 10. The layer 24 may be either formed by winding a strip of the fibrous material around the mandrel 23 or it may comprise a woven tube of fabric slipped over the mandrel. This is followed by a layer 25 of rubber or similar material having the property of becoming rigid when suitably cured. The layer 25 is then covered with a layer 26 of fabric or other fibrous material when it is desired to provide the layer 13 as previously described. The layer 25 when the layer 26 is not employed, or the layer 26 when employed, as the case may be, is then surrounded by a layer 27 of rubber or some other material having the property of remaining soft or resilient after being cured, the outer diameter of the layer 27 being substantially greater than the desired outside diameter of the finished bushing. The layer 27 is followed by one or more fabric layers 28 which are preferably employed to maintain the shape of the parts during the curing process and serves to hydraulically compress the various layers. The mandrel 23 together with the various layers described built up on the same is then placed in an oven or other suitable place and subjected to a suitable vulcanizing process for a suitable length of time and then removed. The various layers during this vulcanizing process are intimately joined together to form a single tube-like structure which is removed from the mandrel 23 and the covering 28 is then removed. This tube may then be cut off to provide bushings of suitable length and these cut off portions are then placed on a second mandrel such as 29 the outside diameter of which is of substantially the same or very slightly greater than the diameter of the shaft that is to be received within the finished bushing. The mandrel 29 and the partly finished bushing thereon, which is indicated in Fig. 4 as 30, is then subjected to a recurring process such as by placing it in a dry heat of approximately 200° F. This recurring process causes the partly finished bushing 30 to shrink and brings the lining 24 into close relationship with the mandrel 20 and at the same time so affects the layer 11 that when the mandrel 29 is removed and cooled the layer 11 will become rigid, but it will not affect the resiliency of the outer layer 12. The bushing is then removed from the mandrel 29 and where necessary its outer diameter ground or otherwise machined to the proper outside diameter and where necessary the length of the same machined to the desired dimensions. The inside diameter will be maintained at the same diameter as the outside of the mandrel 29 and will require no machining in order to receive the shaft 14 in the proper manner. It is to be noted that in some cases instead of providing the outer covering 28 in the vulcanizing process a suitable mold may be employed in place of the same, but it is my experience that this results in greater production costs than the use of the covering 28.

Formal changes may be made in the specific embodiment of the invention described without departing from the spirit or substance of the broad invention, the scope of which is commensurate with the appended claims.

What I claim is:

1. A bushing comprising a tubular member of fibrous material impregnated with a dry lubricant, a cooperating rigid tubular member of non-metallic vulcanizable material integrally joined thereto, and a cushioning member for supporting both of said tubular members.

2. A bushing comprising a fibrous bearing portion, a rigid shape-maintaining portion of non-metallic moldable material, and a resilient cushioning portion.

3. A bushing comprising a fibrous bearing portion, a rigid non-metallic vulcanizable shape-maintaining portion, and a resilient cushioning portion vulcanized to said shape maintaining portion.

4. A bushing comprising a fibrous bearing portion vulcanized to a rigid non-metallic vulcanizable shape-maintaining portion and enclosed by a shell of soft rubber.

5. A bushing comprising a fibrous bearing portion, a hard-rubber portion for maintaining the shape of said bearing portion, and a soft rubber cushioning portion.

6. A bushing comprising an inner shell of fabric surrounded by a shell of hard rubber enclosed in a soft rubber case.

7. A bushing comprising an inner fabric shell impregnated with a dry lubricant, a surrounding shell of hard rubber vulcanized thereto, and an encircling layer of cushioning material.

8. A bushing comprising a fibrous bearing portion, a layer of rigid moldable material secured thereto, and a layer of cushioning material secured to said rigid material with a layer of fibrous material interposed between it and said rigid material.

9. A bushing comprising an inner fabric bearing portion, a surrounding rigid portion covered by a layer of fabric, and a layer of resilient material surrounding said layer of fabric and intimately secured thereto.

10. A bushing comprising a rigid member provided with a lining and a covering of fabric and encircled by a resilient member.

11. A bushing comprising a rigid tubular member provided with a fabric lining and covering vulcanized thereto, and a layer of resilient material vulcanized to said covering.

12. A bushing comprising a fabric sleeve secured within a rigid member of non-metallic moldable material.

13. A bushing comprising a fabric sleeve having a rigid non-metallic vulcanizable member surrounding the same and vulcanized thereto.

14. A bushing comprising a fabric sleeve provided with a molded covering of non-metallic rigid material.

15. A bushing comprising a fabric bearing sleeve vulcanized to a hard rubber shape-maintaining sleeve.

16. A bushing comprising a fabric bearing sleeve vulcanized to a rigid hard rubber shape-maintaining sleeve.

17. A bushing comprising a rigid shape-maintaining shell, and an inner and outer fabric shell intimately secured thereto.

FRED C. MORRIS.